(12) United States Patent
Xu et al.

(10) Patent No.: US 10,318,039 B2
(45) Date of Patent: Jun. 11, 2019

(54) PRESSURE-SENSITIVE TOUCH PANEL, METHOD FOR MANUFACTURING THE SAME, AND TOUCH DISPLAY SCREEN

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jiawei Xu, Beijing (CN); Qingpu Wang, Beijing (CN); Youlu Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/649,965

(22) Filed: Jul. 14, 2017

(65) Prior Publication Data
US 2018/0018056 A1    Jan. 18, 2018

(30) Foreign Application Priority Data
Jul. 15, 2016   (CN) .......................... 2016 1 0562458

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 2203/04103* (2013.01)

(58) Field of Classification Search
CPC ..................... G06F 3/041; G06F 3/044; G06F 2203/04103; G06F 2203/04105;
(Continued)

(56) References Cited

U.S. PATENT DOCUMENTS 8,568,599 B1 * 10/2013 Yu ........................... G06F 3/044
                                                                216/13
2008/0100587 A1 * 5/2008 Sano ....................... G06F 3/041
                                                                345/173
(Continued)

FOREIGN PATENT DOCUMENTS

| CN | 105183257 A | 12/2015 |
|----|-------------|---------|
| CN | 204926044 U | 12/2015 |
| CN | 105549791 A | 5/2016  |

OTHER PUBLICATIONS

First Office Action for Chinese Application No. 201610562458.5, dated Jun. 11, 2018, 8 Pages.

*Primary Examiner* — Md Saiful A Siddiqui
(74) *Attorney, Agent, or Firm* — Brooks Kushman P.C.

(57) ABSTRACT

A pressure-sensitive touch panel, a method for manufacturing the pressure-sensitive touch panel, and a touch display screen are provided. The pressure-sensitive touch panel includes a substrate and a touch sensor and a pressure sensor arranged on the substrate. The touch sensor includes a first electrode and a second electrode, and the pressure sensor includes an upper electrode, a lower electrode and a dielectric layer arranged between the upper electrode and the lower electrode. The upper electrode and the first electrode are arranged in the same layer and formed of the same material, the lower electrode and the second electrode are arranged in the same layer and formed of the same material, and the dielectric layer is formed of an elastic insulation material.

18 Claims, 3 Drawing Sheets

(58) Field of Classification Search
CPC ......... G06F 2203/04106; G06F 3/0414; G06F 3/0412; G06F 2203/04111; G06F 3/047
See application file for complete search history.

(56) References Cited

U.S. PATENT DOCUMENTS

| | | | |
|---|---|---|---|
| 2010/0128002 A1* | 5/2010 | Stacy | G06F 3/016 345/174 |
| 2011/0148811 A1* | 6/2011 | Kanehira | G06F 3/044 345/174 |
| 2011/0304564 A1* | 12/2011 | Kim | G06F 3/044 345/173 |
| 2014/0333579 A1* | 11/2014 | Sleeman | G01L 1/146 345/174 |
| 2017/0269756 A1 | 9/2017 | Wang et al. | |

* cited by examiner

… (1)

PRESSURE-SENSITIVE TOUCH PANEL, METHOD FOR MANUFACTURING THE SAME, AND TOUCH DISPLAY SCREEN

CROSS-REFERENCE TO RELATED APPLICATIONS

The present application claims a priority to a Chinese Patent Application No. 201610562458.5 filed on Jul. 15, 2016, the disclosure of which is incorporated herein in its entirety by reference.

TECHNICAL FIELD

The present disclosure relates to a technical field of touch, and in particular, to a pressure-sensitive touch panel, a method for manufacturing the pressure-sensitive touch panel and a touch display screen including the pressure-sensitive touch panel.

BACKGROUND

With development of science and techniques, a pressure-sensitive touch panel is more and more widely used in display devices of a variety of electronic products.

At present, a capacitive touch sensor is generally used as a touch-sensitive module in a related pressure-sensitive touch panel, and a pressure sensor is added into the pressure-sensitive touch panel as a pressure-sensitive module, and a process for manufacturing the pressure sensor is completely different from that for manufacturing the touch sensor. In a process for manufacturing the pressure-sensitive touch panel, it is necessary to add a pressure sensor after the touch sensor is manufactured, causing the process for manufacturing the pressure-sensitive touch panel to be complex and a manufacture cost thereof to be increased.

SUMMARY

An objective of the present disclosure is to provide a pressure-sensitive touch panel, a method for manufacturing the pressure-sensitive touch panel and a touch display screen including the pressure-sensitive touch panel, so as to simplify a manufacture process of the pressure-sensitive touch panel and reduce manufacture costs of the pressure-sensitive touch panel.

In order to achieve the above objective, a pressure-sensitive touch panel is provided. The pressure-sensitive touch panel includes a substrate, a touch sensor arranged on the substrate, and a pressure sensor arranged on the substrate, wherein the touch sensor includes a first electrode and a second electrode, and the pressure sensor includes an upper electrode, a lower electrode and a dielectric layer arranged between the upper electrode and the lower electrode, the upper electrode and the first electrode are arranged in the same layer and are formed of the same material, the lower electrode and the second electrode are arranged in the same layer and are formed of the same material, and the dielectric layer is formed of an elastic insulation material.

Compared with the related arts, the pressure-sensitive touch panel provided in the present disclosure has the following beneficial effects: the pressure sensor in the pressure-sensitive touch panel according to the present disclosure includes the upper electrode, the lower electrode and the dielectric layer which is flexible and arranged between the upper electrode and the lower electrode. When the pressure-sensitive touch panel is subjected to pressure, the dielectric layer of the pressure sensor may be deformed, a self-capacitance of the pressure sensor may be varied therewith, and thus the pressure performed on the pressure-sensitive touch panel may be identified based on a variation of the self-capacitance of the pressure sensor, thereby achieving a pressure touch operation. Moreover, the upper electrode of the pressure sensor and the first electrode of the touch sensor are arranged in the same layer and are formed of the same material, the lower electrode of the pressure sensor and the second electrode of the touch sensor are arranged in the same layer and are formed of the same material. Therefore, in a process for forming the pressure-sensitive touch panel, the upper electrode of the pressure sensor and the first electrode of the touch sensor may be formed in only one patterning process, and the lower electrode of the pressure sensor and the second electrode of the touch sensor may be formed in another patterning process. Therefore, the process for forming the touch sensor can be fully compatible with that for forming the pressure sensor, and there is no need to additionally provide a pressure sensor into the pressure-sensitive touch panel after the touch sensor has been manufactured, thereby simplifying the process for forming the pressure-sensitive touch panel and greatly reducing the manufacture cost of the pressure-sensitive touch panel.

A method for manufacturing a pressure-sensitive touch panel is further provided in the present disclosure, which includes: forming a second electrode of a touch sensor and a lower electrode of a pressure sensor on a substrate by a first patterning process; forming an insulation layer of the touch sensor on the second electrode and forming a dielectric layer of the pressure sensor on the lower electrode in a second patterning process; and forming a first electrode of the touch sensor on the insulation layer and forming an upper electrode of the pressure sensor on the dielectric layer in a third patterning process.

Compared with the related arts, the beneficial effects of the method for manufacturing a pressure-sensitive touch panel provided in the present disclosure are the same as those of the pressure-sensitive touch panel described above, which are not repeated herein.

A touch display screen is further provided in the present disclosure, which includes the above-described pressure-sensitive touch panel.

Compared with the related arts, the beneficial effects of the touch display screen in to the present disclosure are the same as those of the pressure-sensitive touch panel described above, which are not repeated herein.

BRIEF DESCRIPTION OF THE DRAWINGS

In order to explain technical solutions of embodiments of the present disclosure more clearly, drawings related in description of the embodiments will be briefly illustrated hereinafter. Obviously, the drawings described hereinafter only illustrate some embodiments of the present disclosure, and those skilled in the art may obtain other drawings according to the drawings without creative work.

Figure 1:
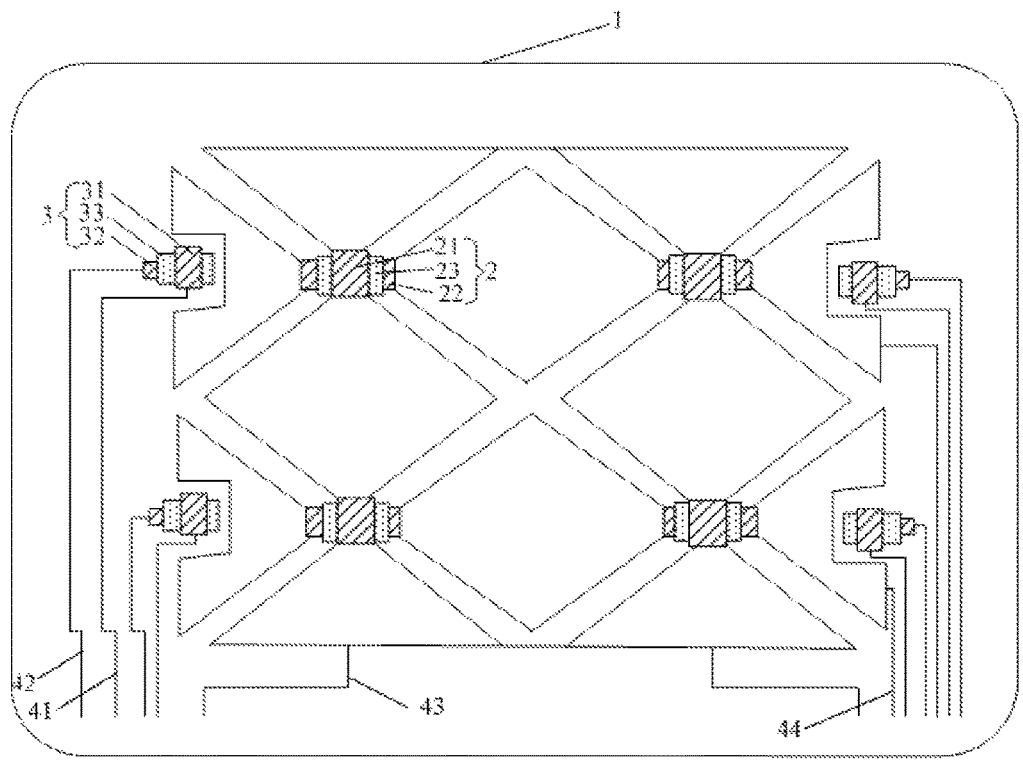
FIG. 1 is a structural schematic diagram of an entirety of a pressure-sensitive touch panel according to embodiments of the present disclosure.

| Description of reference numerals: | | |
|---|---|---|
| 1- substrate, | 2- touch sensor, | 3- pressure sensor, |
| 31- upper electrode, | 32- lower electrode, | 33- dielectric layer, |
| 331- through hole, | 1000- pressure-sensitive touch panel, | |
| 2000- touch display screen, | 21- first electrode, | 22- second electrode, |
| 23- insulation layer, | 4- metal layer, | 41- first peripheral lead, |
| 42- second peripheral lead, | | 43- third peripheral lead, |
| 44- fourth peripheral lead, | | 5- protection layer. |

DETAILED DESCRIPTION

Technical solutions of embodiments of the present disclosure will be described clearly and completely in conjunction with drawings of the present disclosure hereinafter. Obviously, the described embodiments are only a part, but not all, of the embodiments of the present disclosure. All of other embodiments obtained by those skilled in the art based on the embodiments of the present disclosure without creative work fall into the protection scope of the present disclosure.

Figure 2:
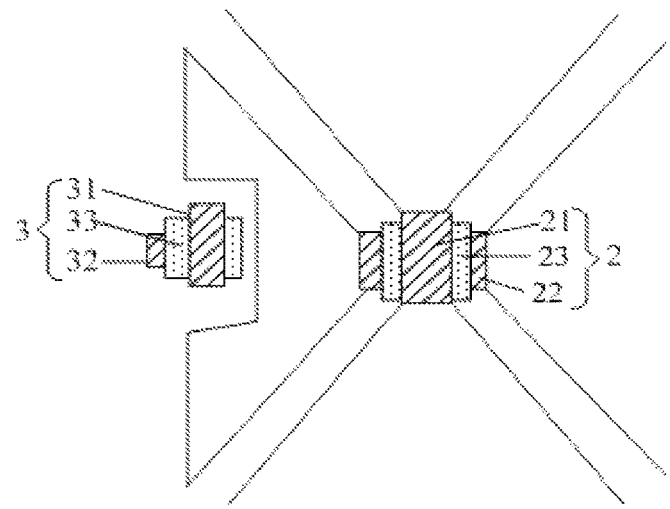
FIG. 2 is a structural schematic diagram of a part of a pressure-sensitive touch panel according to embodiments of the present disclosure.

A pressure-sensitive touch panel 1000 is provided in the embodiments of the present disclosure. As shown in FIG. 1 and FIG. 2, the pressure-sensitive touch panel 1000 includes a substrate 1, a touch sensor 2, and at least one pressure sensor 3. The touch sensor 2 and the at least one pressure sensor 3 are arranged on the substrate 1. The touch sensor 2 includes a first electrode 21 and a second electrode 22. The pressure sensor 3 includes an upper electrode 31, a lower electrode 32 and a dielectric layer 33 arranged between the upper electrode 31 and the lower electrode 32. The upper electrode 31 and the first electrode 21 of the touch sensor 2 are arranged in the same layer and are formed of the same material, the lower electrode 32 and the second electrode 22 of the touch sensor 2 are arranged in the same layer and are formed of the same material, and the dielectric layer 33 is formed of an elastic insulation material.

Figure 3:
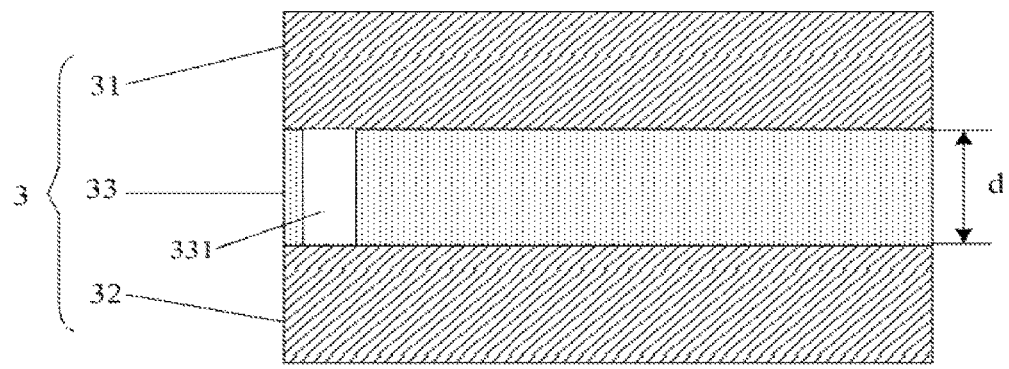
FIG. 3 is a cross-sectional structural schematic diagram of a pressure sensor according to embodiments of the present disclosure.

As shown in FIG. 3, when pressure is performed on a surface of the pressure-sensitive touch panel 1000, the pressure is transmitted from the surface of the pressure-sensitive touch panel 1000 to the pressure sensor 3, and the dielectric layer 33 between the upper electrode 31 and the lower electrode 32 of the pressure sensor 3 is affected and deformed by the pressure, that is, a distance d between the upper electrode 31 and the lower electrode 32 of the pressure sensor 3 is changed, and thus a self-capacitance of the pressure sensor 3 is varied. The larger the pressure is, the greater the deformation of the dielectric layer 33 is and the larger a variation of the self-capacitance of the pressure sensor 3 is. Therefore, the pressure performed on the pressure-sensitive touch panel 1000 may be identified according to the variation of the self-capacitance of the pressure sensor 3, thereby achieving a pressure sensing operation.

Information on positions of touch points may be obtained via the touch sensor 2. An operating principle of the touch sensor 2 is the same as that of a touch sensor in related arts, and may be set by those skilled in the art according to practical conditions, and is not repeated in the embodiments of the present disclosure.

In the technical solutions of the embodiments of the present disclosure, the upper electrode 31 and the first electrode 21 of the touch sensor 2 are arranged in the same layer and are formed of the same material, the lower electrode 32 and the second electrode 22 of the touch sensor 2 are arranged in the same layer and are formed of the same material. Therefore, in the process for manufacturing the pressure-sensitive touch panel, the upper electrode 31 of the pressure sensor 3 and the first electrode 21 of the touch sensor 2 may be formed in only one patterning process, and the lower electrode 32 of the pressure sensor 3 and the second electrode 22 of the touch sensor 2 may be formed in another patterning process. Therefore, the process for manufacturing the touch sensor 2 may be completely compatible with that for manufacturing the pressure sensor 3, without an additional process for manufacturing the pressure sensor 3 in the pressure-sensitive touch panel 1000 after the touch sensor 2 has been manufactured in the pressure-sensitive touch panel 1000, thereby simplifying the process for manufacturing the pressure-sensitive touch panel and greatly reducing the manufacture cost of the pressure-sensitive touch panel.

It should be noted that the first electrode 21 may be a driving electrode of the touch sensor 2, and the second electrode 22 may be a sensing electrode of the touch sensor 2; or the first electrode 21 may be a sensing electrode of the touch sensor 2, and the second electrode 22 may be a driving electrode of the touch sensor 2, which may be selected by those skilled in the art according to practical conditions, and is not specifically limited in the embodiments of the present disclosure.

Optionally, as shown in FIG. 1 and FIG. 2, the touch sensor 2 further includes an insulation layer 23 arranged between the first electrode 21 and the second electrode 22. The material of the insulation layer 23 is the same as that of the dielectric layer 33. Therefore, in the process for manufacturing the pressure-sensitive touch panel, the insulation layer 23 and the dielectric layer 33 may be formed in one patterning process, and thus the process for manufacturing the pressure-sensitive touch panel is further simplified. Optionally, the insulation layer 23 and the dielectric layer 33 may be arranged in the same layer or are the same film layer.

Specifically, the insulation layer 23 and the dielectric layer 33 may be formed of photoresist which is softer, such as a photosensitive resin. The photosensitive resin may be an organic photosensitive resin, an inorganic photosensitive resin, or an organic-inorganic composite photosensitive resin. Since the dielectric layer 33 is soft, a deformation of the dielectric layer 33 may be larger in the presence of external forces, and thus a sensitivity of the pressure sensor 3 is higher.

Additionally, in the embodiments of the present disclosure, a thickness of the dielectric layer 33 may be larger than or equal to 1.5 microns. Optionally, the thickness of the dielectric layer is in a range of 1.5 microns to 3 microns. Tests show that, in case that the thickness of the dielectric layer is larger than or equal to 1.5 microns and when the pressure-sensitive touch panel 1000 is subjected to pressure, the deformation of the dielectric layer 33 may be obtained more easily and thus the variation of the self-capacitance may be acquired easily, thereby achieving the pressure touch operation.

Moreover, in order to prevent the touch sensor 2 from being influenced by the pressure sensor 3, the pressure sensor 3 may be arranged at a periphery of the substrate 1 in the embodiments of the present disclosure. Optionally, as shown in FIG. 1, at least one pressure sensor 3 may be arranged at each corner of the substrate 1, so that the pressure-sensitive touch panel has a better pressure-sensitive touch performance without influencing the touch sensor 2. A specific number of the pressure sensor 3 may be selected by those skilled in the art according to practical conditions, and is not specifically limited in the embodiments of the present disclosure.

Figure 4:
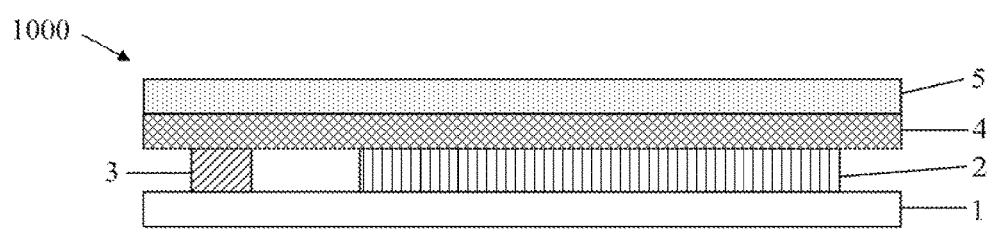
FIG. 4 is a schematic diagram of a layered structure of a pressure-sensitive touch panel according to embodiments of the present disclosure.

In addition, as shown in FIG. 4, a metal layer 4 may be arranged on the pressure sensor 3 and the touch sensor 2. The metal layer 4 includes a first peripheral lead 41, a second peripheral lead 42, a third peripheral lead 43 and a fourth peripheral lead 44. The first peripheral lead 41 is connected to the upper electrode 31 of the pressure sensor 3 and the second peripheral lead 42 is connected to the lower electrode 32 of the pressure sensor 3, so as to transmit a pressure signal. The third peripheral lead 43 is connected to the first electrode 21 of the touch sensor 2 and the fourth peripheral lead 44 is connected to the second electrode 22 of the touch sensor 2, so as to transmit a touch signal. In an example, a through hole 331 may be arranged in the dielectric layer 33, and the second peripheral lead 42 is connected to the lower electrode 32 via the through hole 331.

Optionally, as shown in FIG. 4, a protection layer 5 may be further arranged on the metal layer 4 to protect the metal layer 4, the touch sensor 2 and the pressure sensor 3 from being damaged. The protection layer 5 may be formed of photoresist or the like.

A touch display screen 2000 is further provided in the embodiments of the present disclosure. The touch display screen 2000 includes a display panel and the above-described pressure-sensitive touch panel 1000. Other structures included in the touch display screen are the same as these in the related arts, and may be set by those skilled in the art according to the related arts, and are not repeated herein.

Optionally, the touch display screen may be any product or component having a display function, such as a liquid crystal panel, an electronic paper, a liquid-crystal display television, a liquid-crystal display, a digital photo frame, a mobile phone, a tablet computer. Since the touch display screen includes the above-described pressure-sensitive touch panel, beneficial effects of the touch display screen are the same as those of the pressure-sensitive touch panel described above, and thus are not repeated herein.

Figure 5:
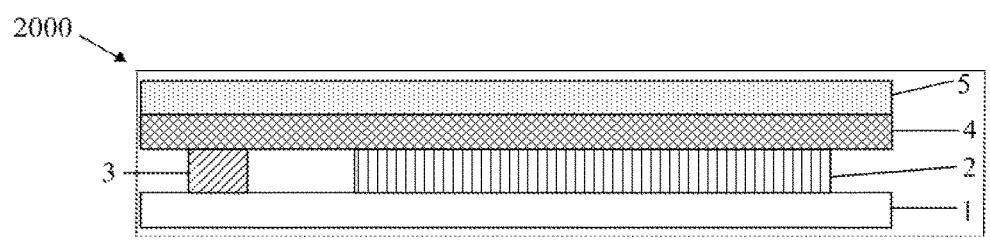
FIG. 5 is a structural schematic diagram of a touch display screen according to embodiments of the present disclosure.
Figure 6:
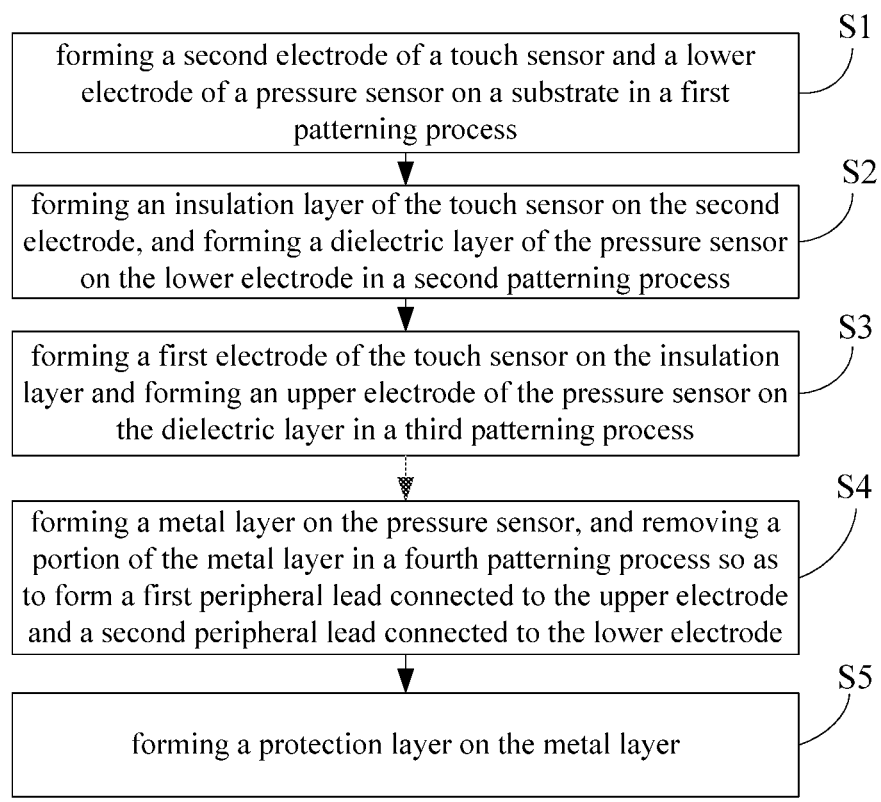
FIG. 6 is a flowchart of a method for manufacturing a pressure-sensitive touch panel according to embodiments of the present disclosure.

A method 100 for manufacturing a pressure-sensitive touch panel is further provided in other embodiments of the present disclosure, and is used to manufacture the pressure-sensitive touch panel 1000 in the present disclosure. Specifically, as shown in FIG. 5, the method 100 for manufacturing a pressure-sensitive touch panel includes step S1 to step S3.

Step S1: forming a second electrode of a touch sensor and a lower electrode of a pressure sensor on a substrate in a first patterning process.

In an example, a transparent conductive film, such as an indium tin oxide film or a metal film, may be formed by way of sputtering, evaporation or the like on the substrate on which a black matrix frame has been formed, and then the second electrode of the touch sensor and the lower electrode of the pressure sensor are formed in one patterning process.

It should be noted that, the patterning processes in the embodiments of the present disclosure include steps of coating photoresist, masking, exposing, developing, and stripping photoresist, unless otherwise specified.

Step S2: forming an insulation layer of the touch sensor on the second electrode, and forming a dielectric layer of the pressure sensor on the lower electrode in a second patterning process.

In step S2, photoresist, such as a photosensitive resin, may be coated on the second electrode and the lower electrode. The photosensitive resin may be an organic photosensitive resin, an inorganic photosensitive resin, or an organic-inorganic composite photosensitive resin. The insulation layer and the dielectric layer may be formed in one patterning process, thereby further simplifying the process for manufacturing the pressure-sensitive touch panel. Since the thickness of the dielectric layer may be larger than or equal to 1.5 microns, when the pressure-sensitive touch panel is subjected to pressure, the deformation of the dielectric layer may be obtained more easily, and thus the variation of the self-capacitance may be obtained easily, thereby achieving the pressure touch operation.

Step S3: forming a first electrode of the touch sensor on the insulation layer, and forming an upper electrode of the pressure sensor on the dielectric layer in a third patterning process.

Similarly, a transparent conductive film, such as an indium tin oxide film or a metal film, may be formed by way of sputtering or evaporation on the substrate on which the insulation layer and the dielectric layer have been formed, and then the first electrode of the touch sensor and the upper electrode of the pressure sensor are formed in one patterning process.

In the technical solution of the embodiment, the upper electrode of the pressure sensor and the first electrode of the touch sensor may be formed in only one patterning process, and the lower electrode of the pressure sensor and the second electrode of the touch sensor may be formed in another patterning process. Therefore, the process for manufacturing the touch sensor may be completely compatible with that for manufacturing the pressure sensor, and there is no need to additionally provide a pressure sensor in the pressure-sensitive touch panel after the touch sensor has been manufactured in the pressure-sensitive touch panel, thereby simplifying the process for manufacturing the pressure-sensitive touch panel and greatly reducing the manufacture cost of the pressure-sensitive touch panel.

Optionally, the above-described method for manufacturing a pressure-sensitive touch panel may further include steps S4 and S5.

Step S4: forming a metal layer on the pressure sensor, and removing a portion of the metal layer in a fourth patterning process so as to form a first peripheral lead connected to the upper electrode and a second peripheral lead connected to the lower electrode.

In an example, a metal layer, such as a molybdenum metal layer or an aluminum metal layer which have good conductivities, may be formed by way of sputtering or evaporation on the substrate on which the first electrode and the upper electrode have been formed, and then the first peripheral lead connected to the upper electrode of the pressure sensor and the second peripheral lead connected to the lower electrode of the pressure sensor are formed in one patterning process.

In addition, in step S4, a third peripheral lead connected to the first electrode of the touch sensor and a fourth peripheral lead connected to the second electrode of the touch sensor may be formed when the first peripheral lead and the second peripheral lead are formed in the patterning process.

Step S5: forming a protection layer on the metal layer.

In an example, a protection layer may be formed by way of coating or deposition on the substrate on which the metal layer has been formed. A material forming the protection layer may be a photosensitive resin, such as an organic photosensitive resin, an inorganic photosensitive resin, or an organic-inorganic composite photosensitive resin.

The foregoing description is merely illustrative of particular embodiments of the present disclosure, and the scope of the present disclosure is not limited thereto. Any variations or substitutions of technical solutions of the present disclosure which readily occur to those skilled in the art are within the scope of the present disclosure, and thus the scope of the present disclosure is defined in the claims.

What is claimed is:

1. A pressure-sensitive touch panel, comprising:
a substrate;
a plurality of touch sensors arranged on the substrate;
a plurality of pressure sensors arranged on the substrate; and
a metal layer arranged on both the plurality of pressure sensors and the plurality of touch sensors, and comprising a first peripheral lead, a second peripheral lead, a third peripheral lead, and a fourth peripheral lead,
wherein each touch sensor of the plurality of touch sensors comprises a first electrode and a second electrode, and each pressure sensor of the plurality of pressure sensors comprises an upper electrode, a lower electrode, and a dielectric layer arranged between the upper electrode and the lower electrode, the second electrode directly contacts the substrate, the upper electrode and the first electrode are arranged in the same layer and are formed of the same material, the lower electrode and the second electrode are arranged in the same layer and are formed of the same material, and the dielectric layer is formed of an elastic insulation material, and the first peripheral lead is connected to the upper electrode, the second peripheral lead is connected to the lower electrode, the third peripheral lead is connected to the first electrode, and the fourth peripheral lead is connected to the second electrode.

2. The pressure-sensitive touch panel according to claim 1, wherein the touch sensor further comprises an insulation layer arranged between the first electrode and the second electrode, a material of the insulation layer is the same as that of the dielectric layer, and the insulation layer and the dielectric layer are arranged in the same layer or are the same film layer.

3. The pressure-sensitive touch panel according to claim 2, wherein the insulation layer and the dielectric layer are formed of photoresist.

4. The pressure-sensitive touch panel according to claim 1, wherein a thickness of the dielectric layer is in the range of 1.5 microns to 3 microns.

5. The pressure-sensitive touch panel according to claim 1, wherein the plurality of pressure sensors is arranged at a periphery of the substrate.

6. The pressure-sensitive touch panel according to claim 4, wherein at least one of the plurality of pressure sensors is arranged at each corner of the substrate.

7. The pressure-sensitive touch panel according to claim 1, wherein a through hole is arranged in the dielectric layer, and the second peripheral lead is connected to the lower electrode via the through hole.

8. The pressure-sensitive touch panel according to claim 1, wherein the first electrode is a driving electrode, and the second electrode is a sensing electrode; or
the first electrode is a sensing electrode, and the second electrode is a driving electrode.

9. A touch display screen, comprising:
the pressure-sensitive touch panel according to claim 1.

10. The pressure-sensitive touch panel according to claim 1, wherein, the plurality of touch sensors are arranged in multiple rows and multiple columns, two pressure sensors of the plurality of pressure sensors are arranged to a left side and a right side of each row of touch sensors in the plurality of four touch sensors, respectively.

11. The pressure-sensitive touch panel according to claim 1, wherein the first peripheral lead and the second peripheral lead are arranged to a first side and a second side of the plurality of touch sensors, and the fourth peripheral lead is arranged to the second side of the plurality of touch sensors, and the third peripheral lead is arranged to a third side of the plurality of touch sensors.

12. The pressure-sensitive touch panel according to claim 11, wherein, the first side and the second side are opposite to each other.

13. A method for manufacturing a pressure-sensitive touch panel, wherein the pressure-sensitive touch panel includes a substrate, a plurality of touch sensors arranged on the substrate, a plurality of pressure sensors arranged on the substrate, and a metal layer arranged on both the plurality of pressure sensors and the plurality of touch sensors, the metal layer including a first peripheral lead, a second peripheral lead, a third peripheral lead, and a fourth peripheral lead, wherein each touch sensor of the plurality of touch sensors includes a first electrode and a second electrode, and each pressure sensor of the plurality of pressure sensors includes an upper electrode, a lower electrode, and a dielectric layer arranged between the upper electrode and the lower electrode, the second electrode directly contacts the substrate, the upper electrode and the first electrode are arranged in the same layer and are formed of the same material, the lower electrode and the second electrode are arranged in the same layer and are formed of the same material, and the dielectric layer is formed of an elastic insulation material, and the first peripheral lead is connected to the upper electrode, the second peripheral lead is connected to the lower electrode, the third peripheral lead is connected to the first electrode, and the fourth peripheral lead is connected to the second electrode, the method comprising:
forming second electrodes of the plurality of touch sensors and lower electrodes of the plurality of pressure sensors on the substrate by a first patterning process, wherein the second electrodes directly contact the substrate;
forming an insulation layer of each touch sensor of the plurality of touch sensors on the second electrode of the touch sensor and forming the dielectric layer of each pressure sensor of the plurality of pressure sensors on the lower electrode of the pressure sensor by a second patterning process;
forming first electrodes of the plurality of touch sensors on the insulation layer and forming upper electrodes of the plurality of pressure sensors on the dielectric layer by a third patterning process;
forming the metal layer on the plurality of pressure sensors and the plurality of touch sensors; and
removing a portion of the metal layer by a fourth patterning process, so as to form the first peripheral lead connected to the upper electrode and the second peripheral lead connected to the lower electrode, and the third peripheral lead connected to the first electrode and the fourth peripheral lead connected to the second electrode.

14. The method according to claim 12, further comprising:
  forming a protection layer on the metal layer.

15. The method according to claim 13, wherein forming an insulation layer of each touch sensor of the plurality of touch sensors on the second electrode of the touch sensor and forming the dielectric layer of each pressure sensor of the plurality of pressure sensors on the lower electrode of the pressure sensor by the second patterning process, comprises:
  coating photoresist on the second electrode and the lower electrode; and
  forming the insulation layer and the dielectric layer by the second patterning process.

16. The method according to claim 13, wherein the plurality of pressure sensors is arranged at a periphery of the substrate.

17. The method according to claim 16, wherein at least one of the plurality of pressure sensors is arranged at each corner of the substrate.

18. The method according to claim 13, wherein after forming an insulation layer of each touch sensor of the plurality of touch sensors on the second electrode of the touch sensor and forming the dielectric layer of each pressure sensor of the plurality of pressure sensors on the lower electrode of the pressure sensor by a second patterning process, the method further comprises:
  arranging a through hole in the dielectric layer.

* * * * *